(12) United States Patent
Duncan

(10) Patent No.: US 6,969,215 B2
(45) Date of Patent: Nov. 29, 2005

(54) METHOD AND APPARATUS FOR LAYING PIPE ON AN INCLINE

(76) Inventor: Kenneth R. Duncan, 13789 FM 1944, Odem, TX (US) 78370

( * ) Notice: Subject to any disclaimer, the term of this patent is extended or adjusted under 35 U.S.C. 154(b) by 0 days.

(21) Appl. No.: 10/798,644

(22) Filed: Mar. 11, 2004

(65) Prior Publication Data

US 2005/0201833 A1    Sep. 15, 2005

(51) Int. Cl.$^7$ .............................................. F16L 1/028
(52) U.S. Cl. ................. 405/184; 405/184.4; 405/154.1
(58) Field of Search .......................... 405/184.4, 184, 405/174, 157, 154.1

(56) References Cited

U.S. PATENT DOCUMENTS

| | | | |
|---|---|---|---|
| 2,991,974 A | | 7/1961 | Bingham |
| 3,248,884 A | | 5/1966 | Bender |
| 3,744,259 A | * | 7/1973 | Wagley ..................... 405/174 |
| 4,069,684 A | * | 1/1978 | Wilson ....................... 405/157 |
| 4,130,925 A | * | 12/1978 | Gibson ........................ 405/174 |
| 5,197,713 A | | 3/1993 | Strosnider |
| 6,450,736 B1 | | 9/2002 | Eck |
| 6,588,984 B1 | | 7/2003 | Fukui |
| 6,742,964 B2 | * | 6/2004 | Fukui ....................... 405/184.4 |

FOREIGN PATENT DOCUMENTS

JP        60-5905    *  1/1985   ................ 405/184

* cited by examiner

Primary Examiner—Frederick L. Lagman
(74) Attorney, Agent, or Firm—G. Turner Moller

(57) ABSTRACT

A pipeline is constructed in steep terrain by digging a ditch on the incline, assembling pipe joints together adjacent a top of the incline and then lowering the assembled pipe joints down the incline through the ditch. A wheeled assembly at the lower end of the pipeline carries much of the load and rolls down the ditch as allowed by winch equipment at the top of the incline. Bearing supports are installed periodically in the ditch to support the pipeline, the supports being of a softer material than coatings on the pipe.

24 Claims, 10 Drawing Sheets

METHOD AND APPARATUS FOR LAYING PIPE ON AN INCLINE

This invention relates to an improved method and apparatus for laying pipe on inclined terrain and more particularly to laying pipe from adjacent the top of an incline toward the bottom.

BACKGROUND OF THE INVENTION

The least expensive method of transporting large relatively constant quantities of liquids, slurries and gases is through pipelines buried in the earth. Once pipelines are built, operating costs are very small relative to the value of the contents being transported, safety concerns are much reduced and environmental impact from spills and leaks are very small. In other words, pipelines are the preferred method of transporting large quantities of liquids, slurries and gases. Unfortunately, initial capital costs are a very large proportion of the total cost of transporting fluids by pipeline meaning that very large sums are spent before any income is received. Accordingly, there is a large incentive to find less expensive techniques for installing or laying small and large diameter pipelines.

Laying pipelines in relatively flat or moderately hilly country is done routinely and is not exorbitantly expensive. Pipelining in mountains or other steeply inclined terrain is difficult and exorbitantly expensive. The standard technique for laying pipeline on a steeply inclined area such as a mountain side or across a fault scarp, is to trench the route on the steepest and most direct route and then lay pipe from the bottom upwardly toward the top. Pipe joints are welded together, one joint at a time, in the ditch. After the welds are inspected and the bared ends field coated, the ditch is backfilled by pushing spoil back in the ditch.

Installing pipelines on a steep incline is very slow, very dangerous and thus very expensive. There is always a danger of rocks, debris or equipment careening down the right-of-way, imperiling those below. It is difficult to stand on a steep incline, much less walk, weld or hold massive pipe joints in a position where they can be welded. There are many variables, of course, but it would not be surprising to learn that the cost per foot of laying pipe on a steep incline on any particular job may exceed $1000 per foot or be twenty five to thirty five times the cost per foot of laying comparable pipe in a conventional manner on flat ground or along a moderately hilly route where pipelining can be done in a normal manner.

A moderately sized spread of men and equipment can lay pipe on flat or moderately hilly ground at a surprisingly rapid rate. A common speed would be several miles per day of pipe welded together, field coated, inspected, transferred to the ditch and backfilled. In contrast, pipelining on a steep slope is very slow. A common speed would be one to two lengths of pipe per day, totalling perhaps eighty feet per day but it could be much slower depending on the steepness of the slope, the material on the surface, the weather, and the diameter of the pipe being installed.

Disclosures of interest relative to this invention are found in U.S. Pat. Nos. 2,991,974; 3,248,884; 5,197,713; 6,450,736 and 6,588,984.

SUMMARY OF THE INVENTION

In this invention, pipelining on a steep slope is done by welding pipe joints together at or near the top of the slope, lowering the joined pipeline section into the ditch so the pipeline slides down the slope while in the ditch, welding additional joints to the upper end of the joined pipeline section and lowering the pipeline section again. This process is repeated until the lower end of the pipeline reaches the bottom of the slope where the lower end of the inclined pipeline is tied in to a pipeline section leading away from the slope.

There are four major problems encountered when pipelining down a steep incline from the top: how does one safely hold the pipeline at the top of the incline so work can be done, how does one safely slide the pipeline in a controlled manner down the incline, how does one support the pipeline in its travel down the slope without irreparably damaging the coating on the exterior of the pipe and how does one steer the lower end of the pipeline if it attempts to curve into a side of the ditch, as it will almost surely do.

One feature of this invention is the provision of a mechanism on the lowermost end of the pipeline that allows the pipeline to slide down the incline. This mechanism is typically wheeled and placed in the ditch so the pipeline follows the ditch down the incline. Downward movement of the mechanism is controlled in any suitable manner. One technique is to use cables attached to the mechanism which are slowly paid out. Another technique is to provide two sets of slips holding the upper end of the pipeline. Periodically, one of the slips is released and the other set of slips, connected by cables to a winch, is lowered by paying out the cable. In the latter technique, the pipe is used to transfer the load of the pipe to equipment at the top of the slope. The lower end of the pipeline can be steered in a variety of ways, one of which is to provide jacks pushing between the mechanism and the side of the ditch so the mechanism moves away from one side of the ditch.

Another feature of this invention is the provision of bearings in the ditch to provide support for the pipeline during sliding movement down the incline. By selecting the material of the bearings to be softer than the material of the pipeline coatings, any wear that occurs is on the bearings and not on the pipeline coating. In addition, the bearings may be lubricated in a suitable manner to facilitate the pipe moving smoothly over the bearings.

An important advantage of this invention is minimizing the number of people on the incline. Because all of the work done in joining pipeline sections together, in inspecting welds and in field coating bare pipe adjacent the welds is done at or near the top of the incline and almost no work is done on the incline, the number of people on the slope is minimized. This is extremely important for safety reasons. If there are fewer people on the slope, then fewer people can be hurt by rocks or debris careening down the incline. In addition, the fewer number of people on the slope provides fewer opportunities for people to be the cause of dislodging rocks or the like to imperil those below.

An important advantage of this invention is minimizing of the width of the right-of-way that needs to be cleared. The right-of-way is usually an easement bought and used by the pipeline owner on which the pipeline is laid. A typical pipeline right-of-way is 50–100' wide. Previously, the entire right-of-way would be cleared of trees, brush and debris. In the practice of this invention, a much narrower cleared right-of-way is sufficient because so few workmen and such little equipment is actually on the slope. A cursory investigation of the costs of pipelining, both financial and environmental, will reveal that the wider the cleared right-of-way, the higher the costs. In this invention, almost all of the work done in joining pipeline sections together is done at or near the top of the incline and almost no work is done on the incline. Thus, the right-of-way that needs to be cleared on the incline is no wider than necessary to accommodate the men and equipment needed to ditch a path down the incline. Whatever part of the right-of-way that needs to be cleared to make the ditch will necessarily be of sufficient width to accommodate men and equipment needed during laying of the pipeline. Minimizing the width of the cleared right-of-way is particularly important on a steep incline because it minimizes erosion after the pipeline is in the ground.

Another important advantage of this invention is minimizing the amount of winch equipment needed to conduct operations. Heavy construction in mountainous areas is difficult because most equipment will not safely ascend or descend grades much greater than 27° without assistance from other stable stationary equipment. Heavy equipment safely moving on a steep hillside with an excessive grade depends on the nature of the soil. If the surface of the hill is loose material, heavy equipment cannot safely move or be safely operated. Under the best of soil and weather conditions with a 27° slope, most heavy equipment can operate, albeit very slowly. Of course, if the slope contains some rock, which is very common, the maximum safe slope is much less steep because moving equipment loses traction on rock. For example, if solid rock is on the surface, heavy equipment cannot safely negotiate a slope greater than about 9°. The only current solution is to winch the required equipment up and down the slope. If mobile equipment is not stable by itself, winching equipment is used to winch mobile equipment up the slope, hold the mobile equipment until the task is completed and then winch the mobile equipment down the slope. As will be more fully apparent hereinafter, very little equipment need be winched up and down the slope in the practice of this invention.

It is an object of this invention to provide an improved technique for laying pipeline on inclined terrain.

Another object of this invention is to provide an improved method and apparatus for laying pipeline in a ditch on inclined terrain that can be backfilled on completion.

A further object of this invention is to provide an improved method and apparatus for lowering a long pipeline section from the top of an incline toward the bottom.

Another object of this invention is to provide an improved method and apparatus for pipelining in steeply inclined terrain so fewer people are needed on the right-of-way so dangers and costs are substantially reduced.

These and other objects of this invention will become more fully apparent as this description proceeds, reference being made to the accompanying drawings and appended claims.

DETAILED DESCRIPTION

Figure 1:
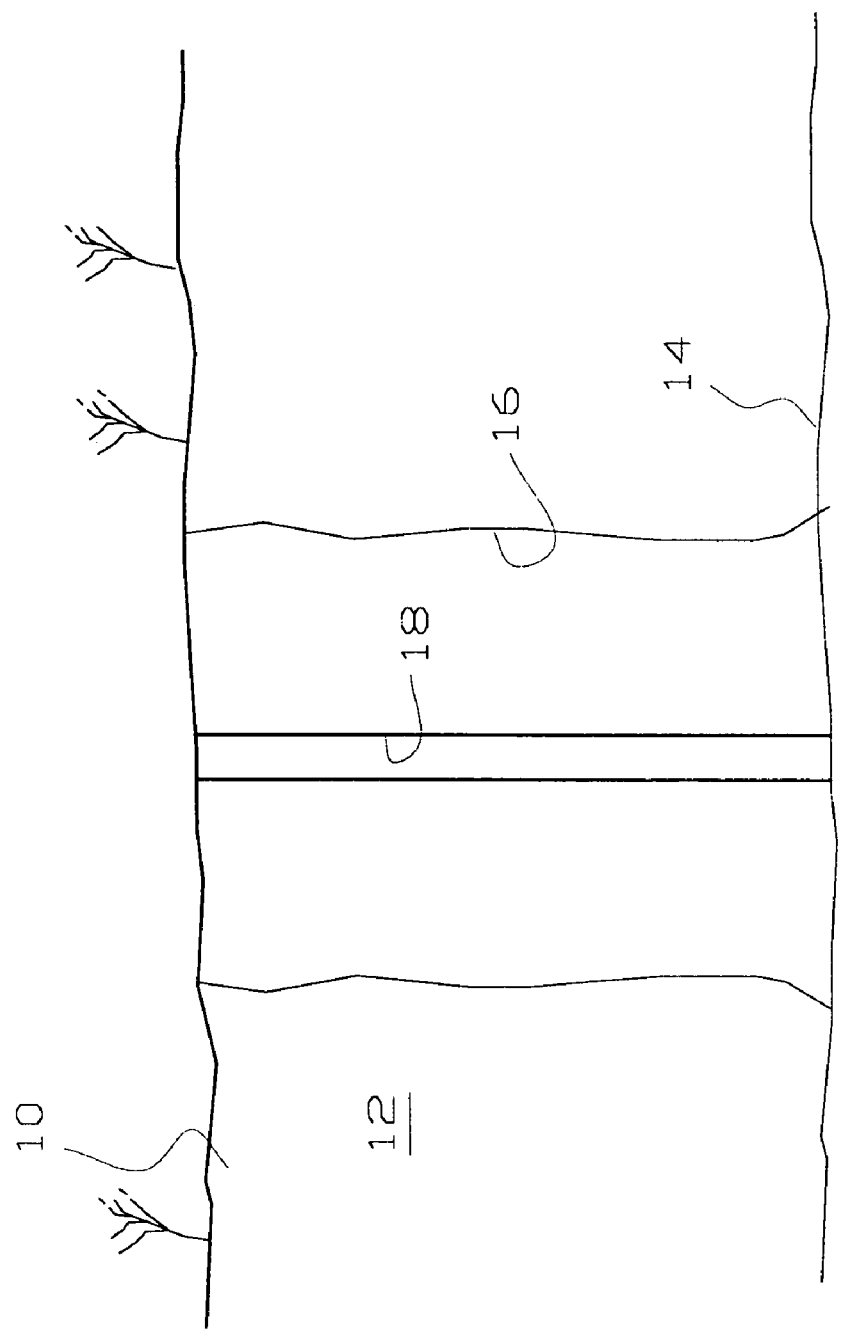
FIG. 1 is a frontal view of a pipelining operation on a mountain side showing the ditch having been made.

Referring to FIGS. 1–8, there is illustrated a pipelining method and apparatus for laying pipe from the top 10 of steep terrain 12 toward the bottom 14 along a cleared right-of-way 16 which has been trenched to provide a straight ditch 18 extending down the terrain 12. In this invention, more than usual care is taken to make the ditch 18 relatively straight and of relatively constant slope because the pipeline 20 will move down the ditch 18. Because the pipe is relatively stiff, any abrupt curves or changes in slope cannot be tolerated. Although the ditch 18 is illustrated as extending straight down the terrain 12, it will be apparent that the ditch 18 may be slightly curved horizontally along the surface of the terrain or slightly bowed vertically to accommodate curvature of the slope. A general rule of thumb is the radius of curvature, in feet, has to be equal or greater than one hundred times the diameter of the pipe in inches. In other words, a 30" diameter pipeline can safely be curved on a radius of 3000' or greater.

The pipeline method and apparatus of this invention has three distinct parts, i.e. what happens at or near the top 10 of the terrain 12, what happens at or near the lower end of the pipeline 20 and what happens at an intermediate part of the pipeline 20.

Figure 3:
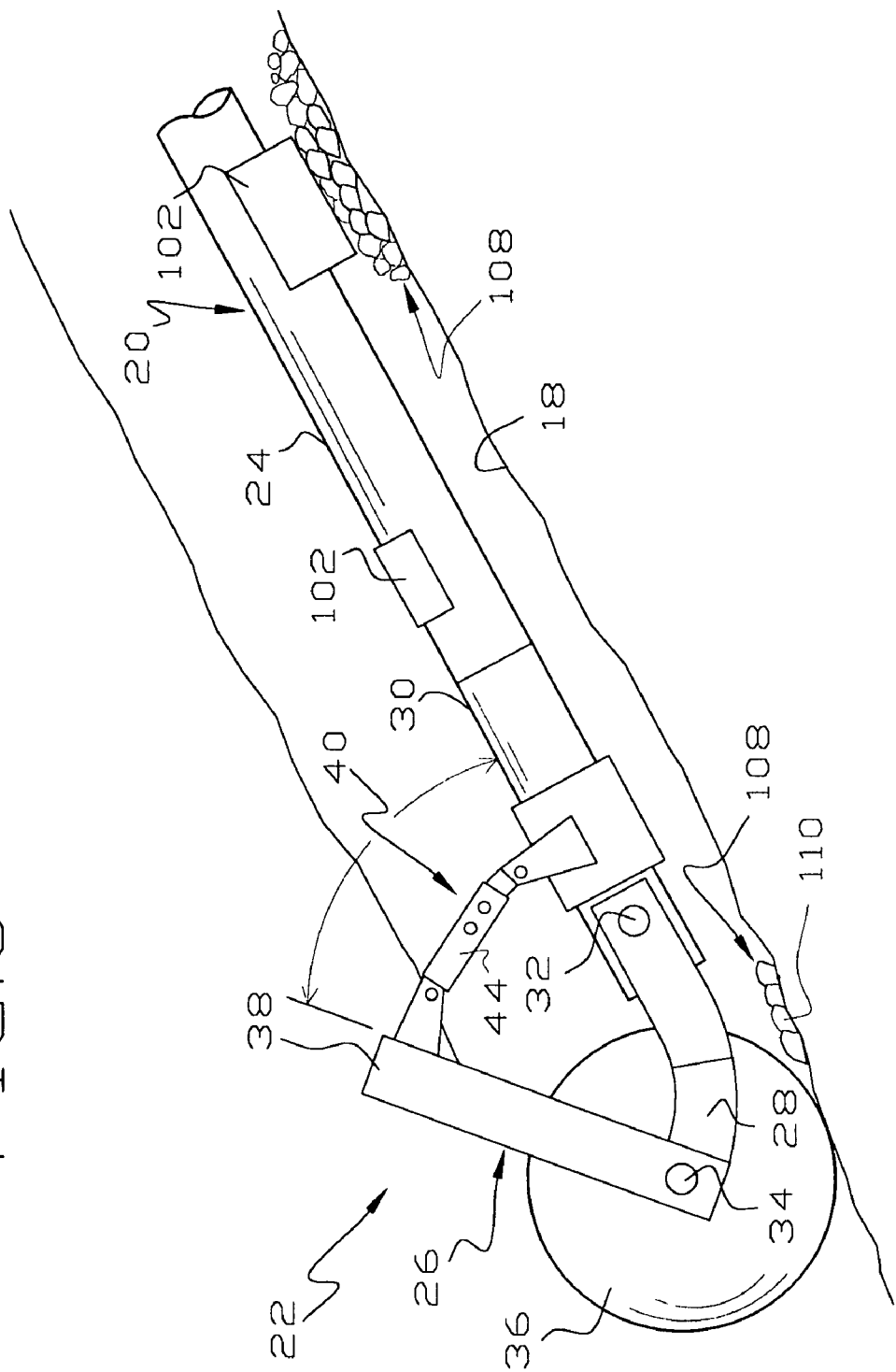
FIG. 3 is a side view of the lower end of the pipeline showing the ditch in lateral cross-section and showing the wheeled assembly supporting the lower end of the pipeline.
Figure 4:
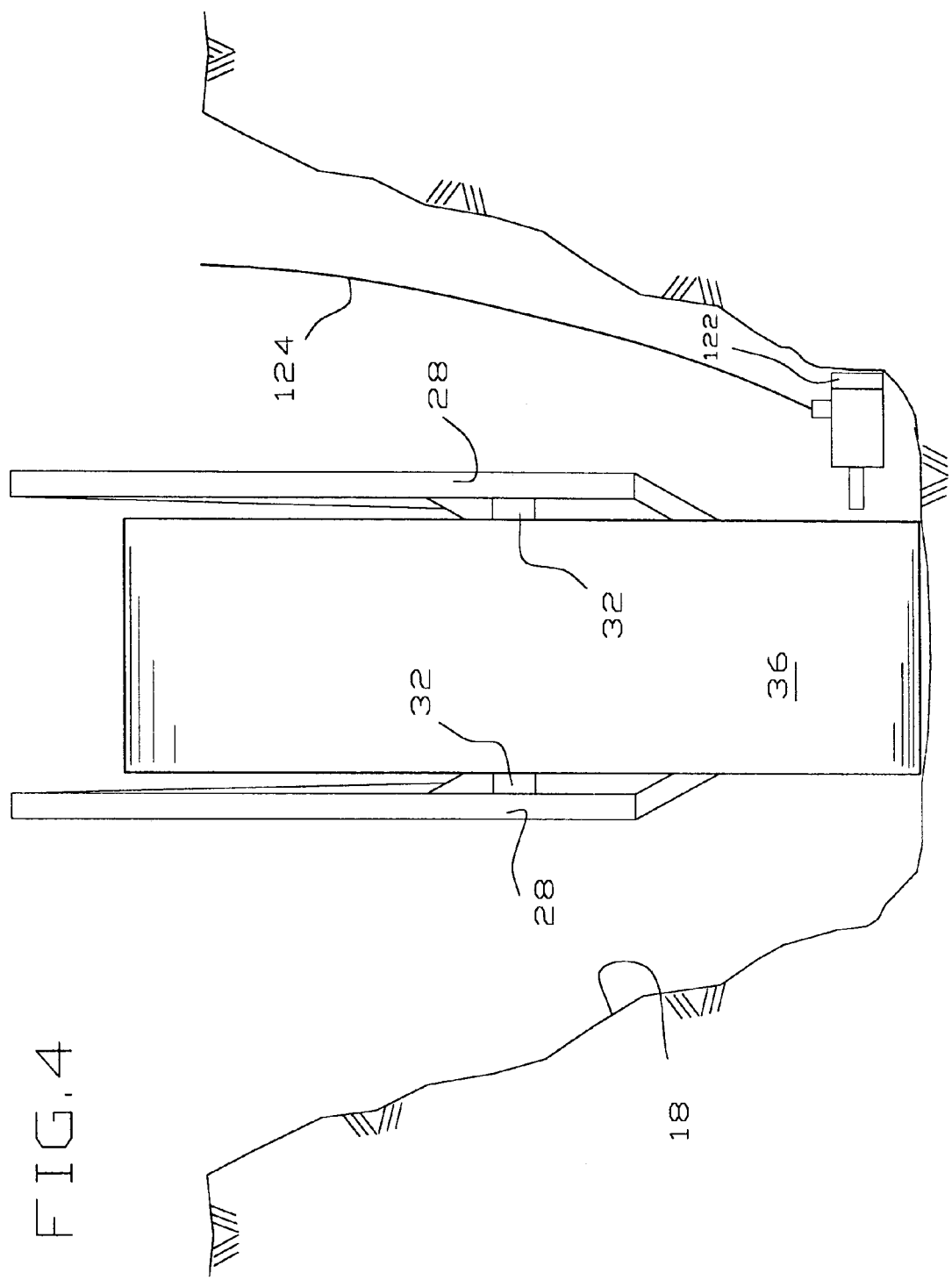
FIG. 4 is a front view of the wheeled assembly of FIG. 3.
Figure 5:
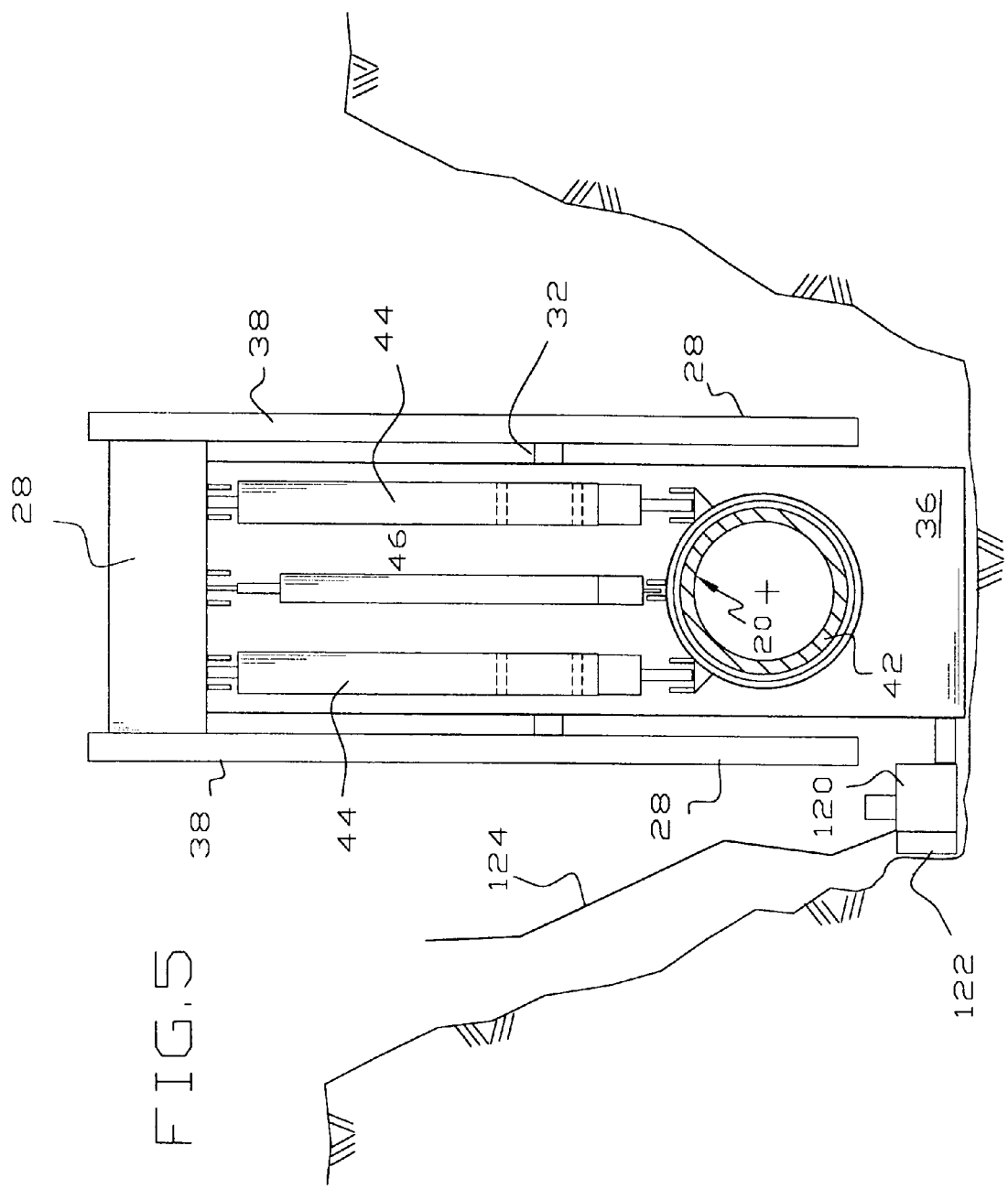
FIG. 5 is a rear view of the wheeled assembly of FIGS. 3 and 4.

After the ditch 18 has been cut and the necessary equipment and pipe have been assembled at or adjacent the top 10, the first pipelining operation is to install an assembly 22 on the lowermost joint 24 of the pipeline 20 as shown best in FIGS. 3–5. The function of the assembly 22 is to facilitate movement of the pipeline 20 down the ditch 18. The assembly 22 comprises a frame 26 having a lower frame member or yoke 28 secured, as by welding or the like, to the lowermost joint 24 in a stable manner. To this end, a pup joint 30 is provided which connects to the yoke 28 through a pair of pins 32 integral with the pup joint 30. An axle 34 extends through the frame 26 and a large wheel 36 is mounted on the axle 34.

The frame 26 also includes an upper frame member 38 rigid with the lower frame member 28 at one end and connected at the other end by a connection 40 of adjustable length to a reinforcing pad 42 surrounding and secured to the pup joint 30 in a suitable manner, as by welding or the like. The adjustable connection 40 conveniently includes one or more telescoping braces 44 and a hydraulic cylinder 46 (FIG. 5). Because the pup joint 30 is welded to the lowermost joint 24 of the pipeline 20, adjusting the length of the braces 44 and cylinder 46 changes the angle between the lower frame member 28 and the pup joint 30, thereby raising or lowering the free end of the pup joint 30 relative to the bottom of the ditch 18 and thereby raising or lowering the lower end of the pipeline 20. The cylinder 46 is powered by a hydraulic system (not shown) mounted on the assembly 22 including an internal combustion engine driving a hydraulic pump, suitable hydraulic lines and suitable valves. The lowermost joint 24 and the assembly 22 are placed in the ditch 18, as by the use of a crane 48, so the wheel 36 is below a lower pipe roller assembly 50 (FIG. 2).

Figure 2:
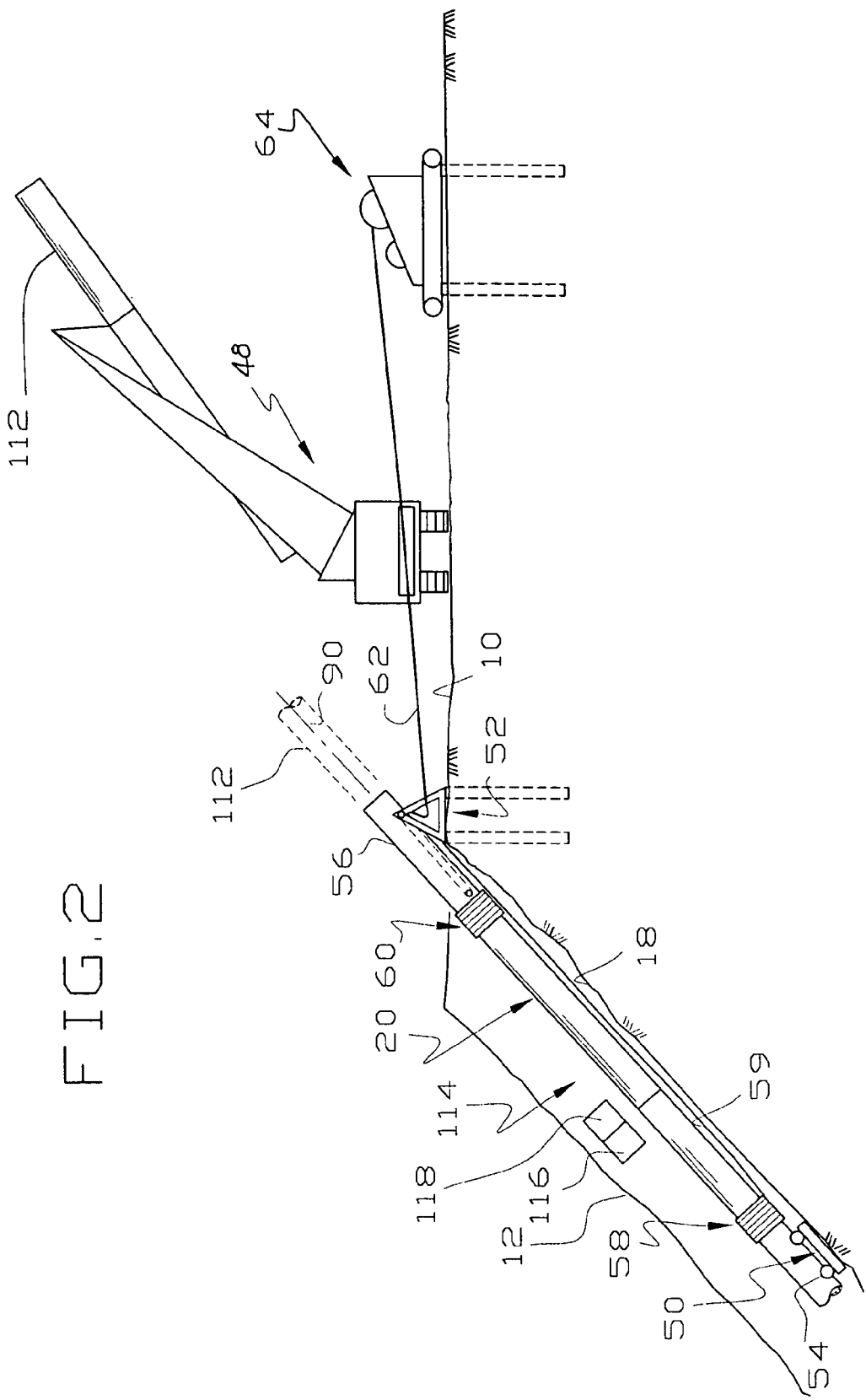
FIG. 2 is a pictorial view of a pipelining operation of this invention, showing the top of the incline and showing the ditch in longitudinal cross-section.

Referring to FIG. 2, the lower pipe roller assembly 50 cooperates with an upper pipe roller assembly 52 to start the pipeline 20 down the mountain side 12. The assemblies 50, 52 are securely anchored in the earth and provide suitable rollers 54, preferably of hour glass shape, engaging the pipeline 20 thereby facilitating sliding of the pipeline 20 down the incline of the ditch 18.

It is necessary to hold the pipeline 20 stationary so suitable pipeline operations can occur, such as welding additional joints to the open end of the uppermost joint 56, inspecting the welds between adjacent joints and field coating the bare ends and welds of the previously coated pipe joints. To this end, a pair of expandable slips 58, 60 are provided. The lower slips 58 are installed in any suitable manner, as by using the crane 48 and suitable attachments (not shown). The lower slips 58 are held in place in the ditch 18 by chains or cables 59 attached to the upper pipe roller assembly 52 and manipulated between positions holding and releasing the pipeline 20 by a suitable control system (not shown). The upper slips 60 are manipulated between positions holding and releasing the pipeline 20 by a suitable control system (not shown) and move up and down the ditch 18 as allowed by a cable or other tension element 62 under the control of a winch system 64.

The slips 58, 60 and winch system 64 operate to hold the pipeline 20 stationary for work to be done on it and then lower the pipeline 20 for movement downward through the ditch 18. To hold the pipeline 20, both slips 58, 60 are in the holding position, preferably with the upper slips 60 raised to the position shown in FIG. 2. To lower the pipeline 20, the lower slips 58 are manipulated to release the pipeline 20 and the upper slips 60 are allowed to move downwardly toward the lower pipe roller assembly 50 by paying out cable 62 from the winch system 64. It will accordingly be seen that the lower slips 58 are relatively stationary and the upper slips 60 are movable.

Figure 6:
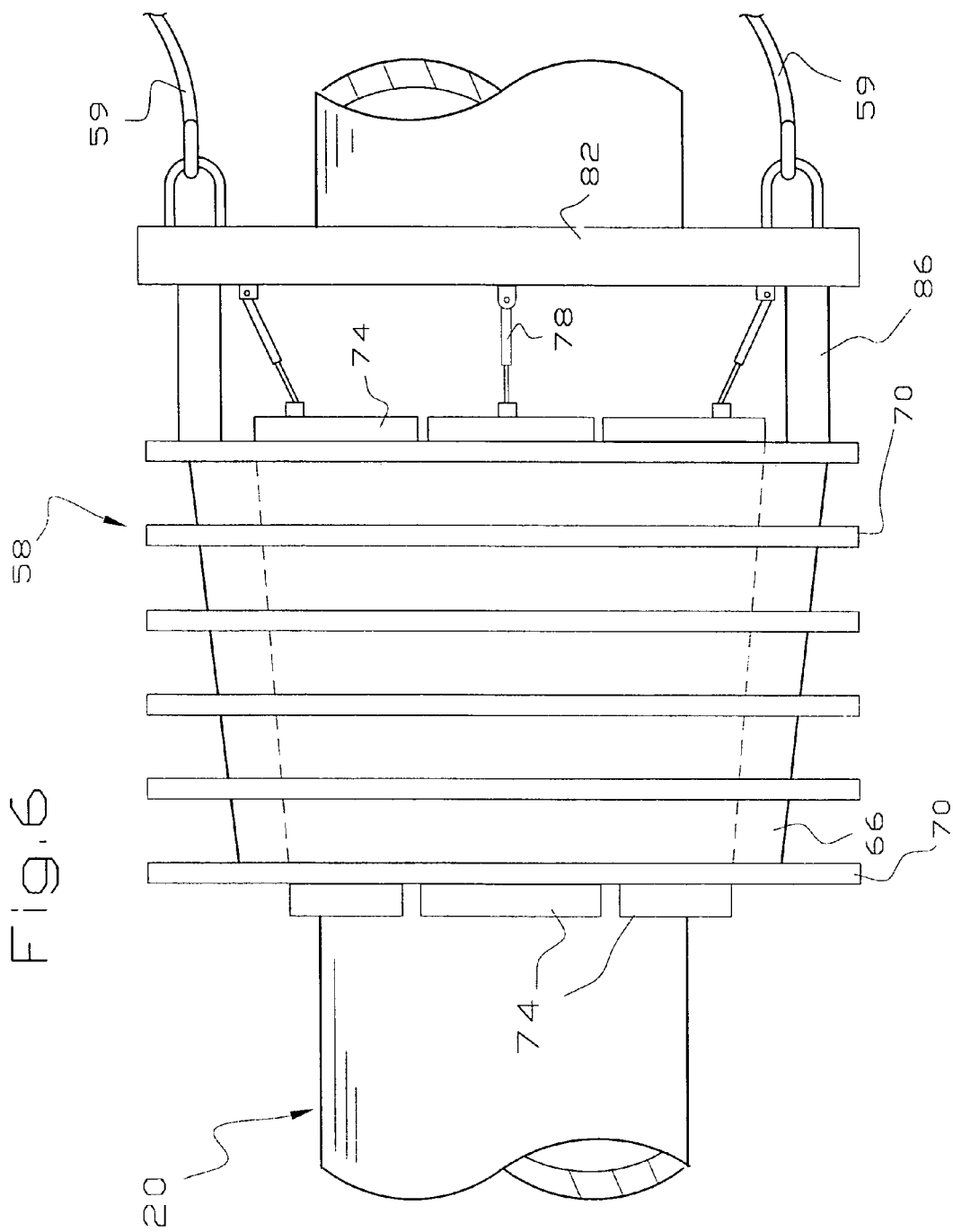
FIG. 6 is a side view of a lower set of slips to hold the pipeline stationary and then to release the pipeline for movement.
Figure 7:
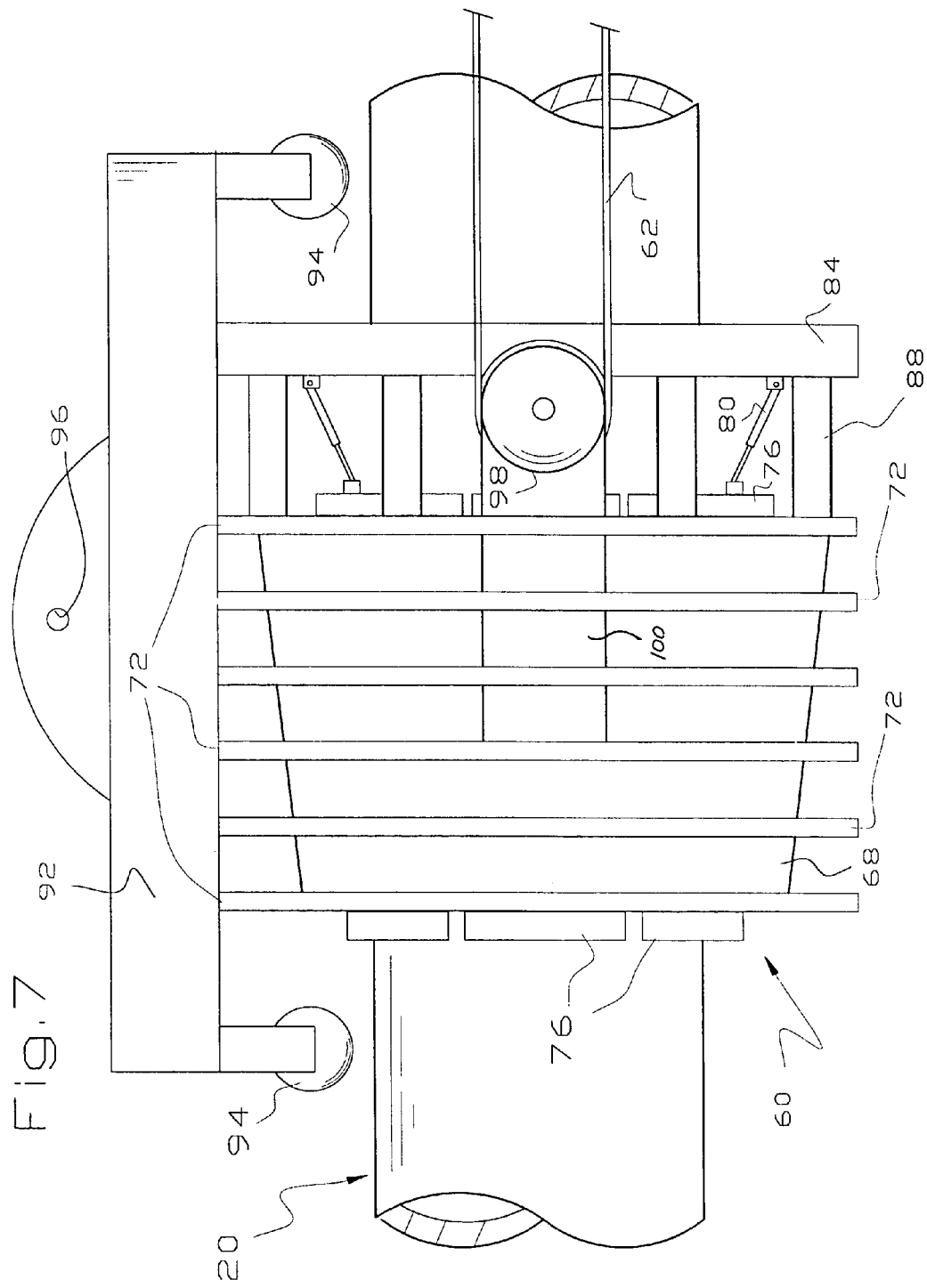
FIG. 7 is a side view of an upper set of slips used to move the pipeline down the incline.

Details of the slips 58, 60 are shown in FIGS. 6 and 7 and have much in common. The slips 58, 60 include a conical sleeve 66, 68 stiffened by a series of ribs 70, 72 and a series of wedge shaped slip segments 74, 76 received inside the sleeves 66, 68. The slip segments 74, 76 are advanced and retracted by hydraulic cylinders 78, 80 acting between the slip segments 74, 76 and a frame member 82, 84 rigid with the sleeves 66, 68 and spaced axially by a series of struts 86, 88. It will be seen that extension and retraction of the hydraulic cylinders 78, 80 causes the slip segments 74, 76 to advance and retract from the conical sleeves 66, 68 thereby gripping and releasing the pipeline 20 from the slips 58, 60.

The lower slips 58 are preferably relatively stationary, either by providing a separate foundation mounted in the ditch 18 or by securing the slips 58 to the upper pipe roller assembly 52 with the chains or cables 59. The upper slips 60 are mounted for movement along an axis 90 parallel to the pipeline 20 and parallel to the ditch 18. To this end, a frame member 92 is attached to the ribs 72 and provides hourglass shaped pipe rollers 94 for abutting and rolling on the pipeline 20 when the slips 60 are released from the pipeline 20. The frame member 92 provides an eye 96 so it can conveniently be hoisted by the crane 48 when needed.

The upper slips 60 include a pair of multiline sheaves 98 mounted for rotation on a frame 100 welded to the cone 68 and ribs 72. The sheaves 98 receive multiple lines of the cable 62 hauled in and paid out by the winch system 64. It will accordingly be seen that, when the pipeline 20 is to be held stationary, the lower and upper slips 58, 60 may both grip the pipeline 20. When the pipeline 20 is to be lowered down the slope in the ditch 18, the upper slips 60 grip the pipeline while the lower slips 58 are actuated to release the pipeline so paying out the cable 62 by the winch system 64 allows the pipeline 20 to slide down the ditch 18 as facilitated by the wheeled assembly 22.

Figure 8:
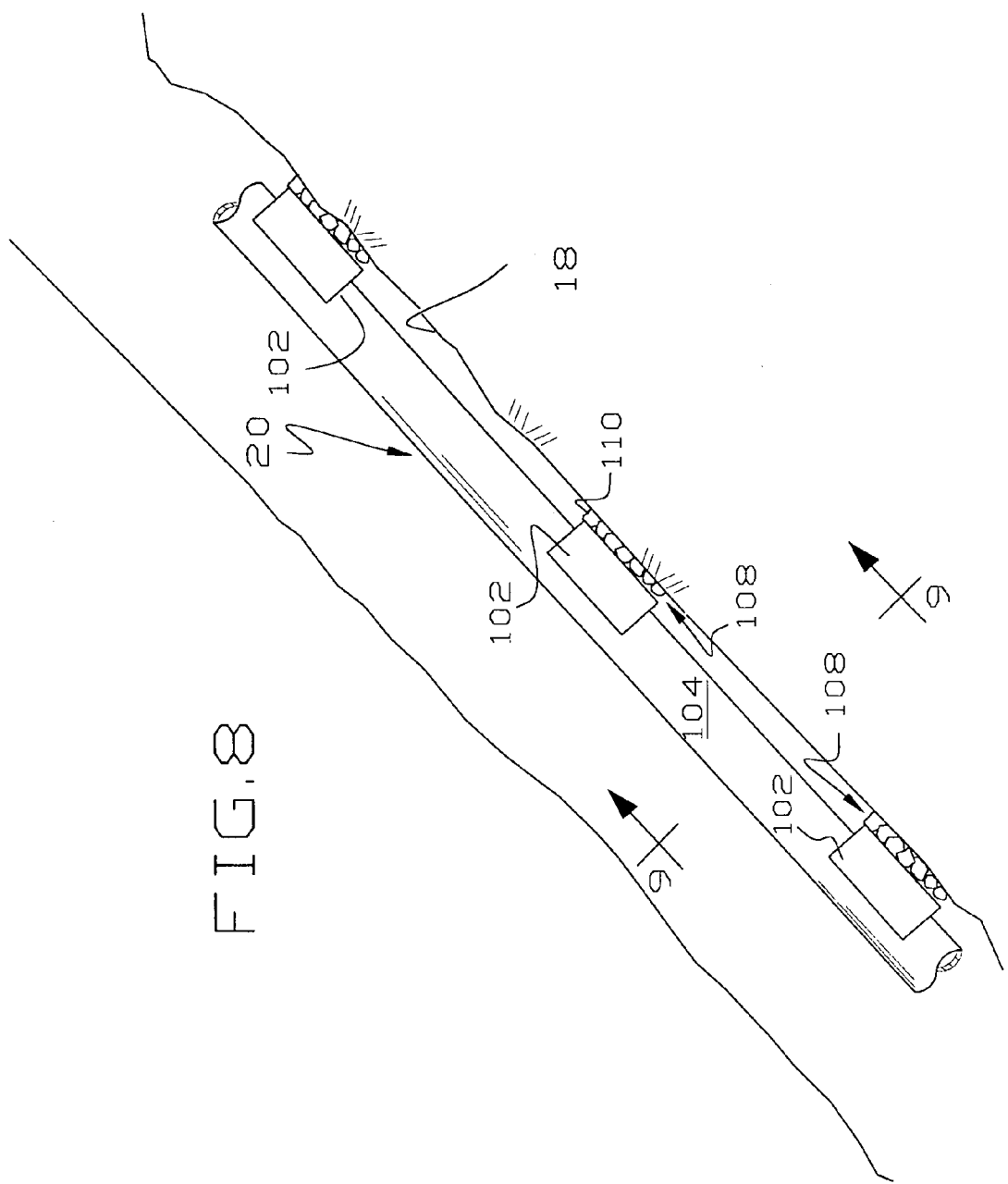
FIG. 8 is a side view of an intermediate portion of the pipeline showing the ditch in longitudinal cross-section.
Figure 9:
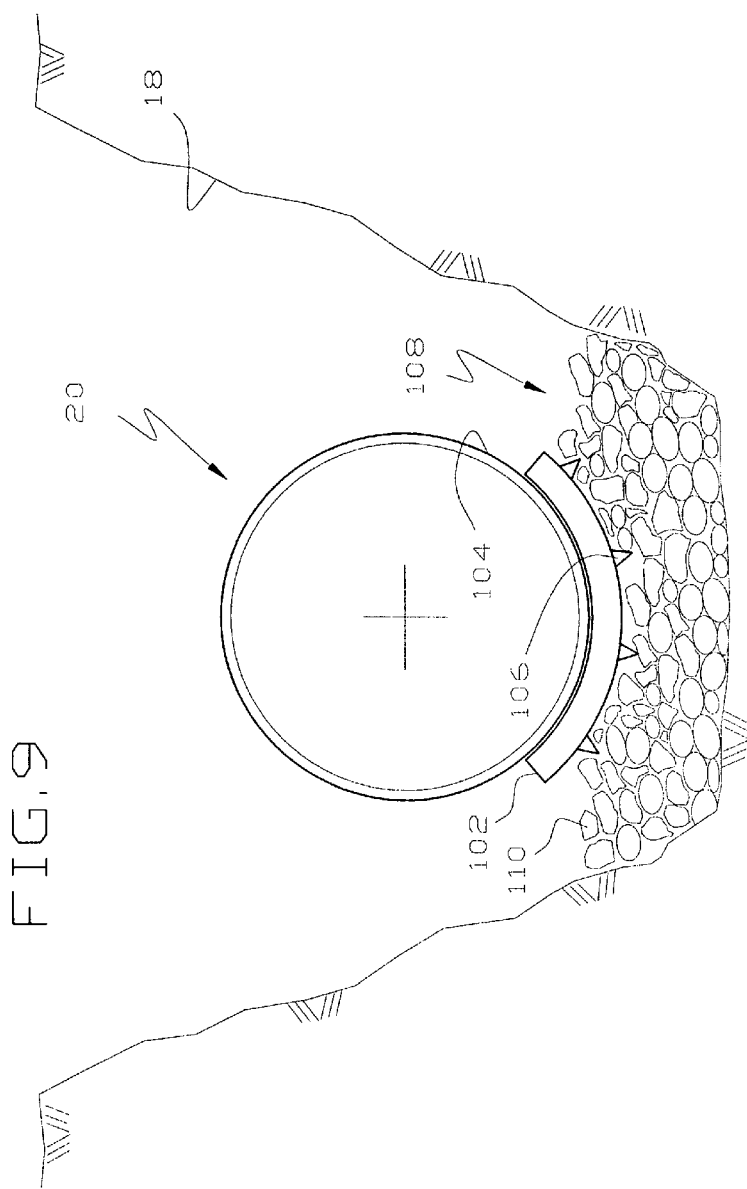
FIG. 9 is a cross-sectional view of the pipeline and ditch taken along line 9—9 in FIG. 8 as viewed in the direction indicated by the arrows.

FIGS. 3, 8 and 9 illustrate an important feature of this invention. Suitable bearings 102 are provided periodically along the length of the pipeline 20 to raise the pipeline 20 above the bottom of the ditch 18 to reduce friction on the pipeline 20 and to control wear of a coating 104 on the exterior of the pipeline 20. Pipeline coatings have evolved substantially over the years so the current state-of-the-art coating is an epoxy based polymer concrete exemplified by POWERCRETE available from Tyco Adhesives of Norwood, Mass. Typically, the pipeline coating is applied at the pipe mill or at a plant long before the joints are delivered to the job location. A short length of metal pipe is left bare on each end so adjacent pipe joints can be welded without degrading the coating. Many permanent type current pipeline coatings are quite hard and tough, typically at least about 75 on the Shore D hardness scale after curing for twenty four hours.

As will be more fully apparent hereinafter, after the joints are welded together, the previously uncoated bare ends of the pipe joints are coated. This occurs at a site in the ditch 18 above the lower slips where the welded joint is being held while an additional joint is being welded on the end of the pipeline. Modern materials for field coating cure quickly enough that there is no appreciable delay in the pipelining operation. For example, in large diameter pipe where this invention has greatest application, it may take an hour or two to weld joints together, leaving plenty of time to X-ray the field weld, prepare the bare ends of the pipe, coat the bare ends or field joint and allow the field coated sections to cure enough so as not to be damaged while the pipeline is sliding down the slope.

An important feature of this invention is that the bearings 102 are considerably softer than the coating 104 so that any wear occasioned by sliding the pipeline 20 across the bearing 102 causes wear on the bearing 102 and not on the coating 104. To this end, the bearing 102 is selected of a suitable plastic or polymeric material such as high or low density polyethylene having a Shore D hardness in the range of 40–60, such as is available from Performance Pipe, Plano, Tex., Maskill Robbins of Houston, Tex. or Forrester Supply of Green Bay, Wis. As shown best in FIGS. 8 and 9, the bearings 102 are generally upwardly concave providing one or more struts or cleats 106 extending away from the bearing 102 to prevent the bearings 102 from slipping off the foundation 108 while the weight of the pipeline 20 is gradually transferred from the wheel assembly 22 to the ditch 18.

As shown in FIG. 3, after passage of the wheel 36, a suitable foundation 108 is placed on the bottom of the ditch 18 to receive the bearings 102. In many instances, the foundation 108 may simply be bags 110 of sand or other particulate material. In some situations, the foundations 108 may need to be sturdier or more elaborate, depending on the slope of the ditch 18 and the available material in the bottom of the ditch. After construction of the foundation 108, the bearing 102 is slid into place in any suitable manner, as by first laying the bearing 102 on top of the pipeline 20 as shown in FIG. 3 and then sliding it downwardly under the pipeline 20 when the wheeled assembly 22 moves away from the last installed foundation 108.

An important feature of this invention is lubricating the bearings 102 with a liquid lubricant thereby promoting sliding movement between the bearings 102 and the pipeline 20 and minimizing tipping or movement of the bearings 102 relative to the ditch 18. To this end, a suitable lubricant such as DYNA-BLUE available from American Polywater Corporation of Stillwater, Minn. is applied to the bearings 102, preferably after each bearings 102 is placed on its foundation 108 and before the pipeline 20 advances into contact with the bearing 102. The lubricant is applied in any suitable manner, as with a mop type applicator or by spraying.

The method of this invention should now be apparent. After the ditch 18 is trenched down the slope 12 and the necessary equipment assembled at the top 10, the lower most joint 24 is welded to the pup joint 30 of the assembly 22. The assembly 22 is then placed in the ditch 18 below the lower pipe roller assembly 50, as by use of the crane 48. The lower slips 58 are manipulated to grip the pipeline 20 and the upper slips 60 are slipped over the inclined end of the upper most pipe joint. The upper slips 60 are actuated to grip the pipeline 20 so the upper end of the upper most pipe joint 56 is securely held in a stationary position.

The crane 48 picks up a joint 112, or a multiple joint, of pipe and holds it in the inclined position shown in dashed lines in FIG. 2. A double joint of pipe is the result of welding two joints of pipe together at a location away from the upper pipe roller 52 and coating the bare ends of the welded pipe to provide a continuous coating 104. Double, or multiple, jointing is a conventional technique to increase the rate of pipe laying. Suitable pipe clamps (not shown) are used to clamp the lower end of the suspended pipe joint 112 coaxial with the uppermost joint 56 and the pipe joints 56, 112 are welded together at a location adjacent the upper pipe roller 52. Upon completion of the weld, the pipeline 20 is lowered down the slope in the ditch, using the slips 58, 60 as previously described. When the most recent weld reaches a location 114 adjacent the lower pipe roller assembly 50, other pipelining operations are conducted such as inspecting the weld with an suitable X-ray machine 116 and coating the bare ends of the newly welded joint with a coating assembly 118, as previously discussed.

At suitable intervals, the sand bags 110 are placed in the ditch behind the wheeled assembly 22 and the bearings 102 placed between the pipeline 20 and the sand bags 110. In the event the pipeline 20 is slightly too low, the cylinder 46 may be manipulated to raise the end of the pipeline or the pipeline 20 may be raised by using a jack under the reinforcing pad 24. When the pipeline 20 reaches the bottom 14 of the inclined terrain 12, the pipeline 20 is stabilized in any suitable manner, the simplest way being simply to back fill the ditch 18 in a few locations spaced along the slope. Under some circumstances, it is feasible to leave the bearings 102 in place and in some situations it is desirable to remove them. If the bearings 102 are removed, a suitable inflatable air bag type jack is brought to the location of each bearing 102, placed under the pipeline 20 near the bearing to be removed and then inflated to raise the pipeline 20 so the bearing 102 can be retrieved.

After the pipeline 20 is stabilized, the wheeled assembly 22 is removed and the lower end of the pipeline is tied into a pipeline leading away from the steep terrain 12 in a conventional manner. At the top of the steep terrain 12, the upper and lower roller assemblies 50, 52 and other equipment at the top 10 are disassembled and removed. The upper end of the pipeline is tied into a pipeline section leading away from the top 10 in a conventional manner.

Referring to FIGS. 4–5, an important feature of this invention is illustrated to steer the assembly 22 in the event it is moving too close to one side or the other of the ditch 18. To this end, a jack 120 is provided. The jack 120 is carried on the wheeled assembly 22 and connected to the hydraulic system powering the cylinder 46. The jack 120 is placed in the ditch 18 and abuts, if necessary, a suitable backup 122, such as a plate or beam, between the jack 120 and ditch 18 to provide additional bearing. Delivering high pressure hydraulic fluid through a hydraulic line 124 extends the jack 120 and pushes the wheel 36 away from the close side of the ditch 18 thereby steering the wheeled assembly along a central portion of the ditch 18.

Figure 10:
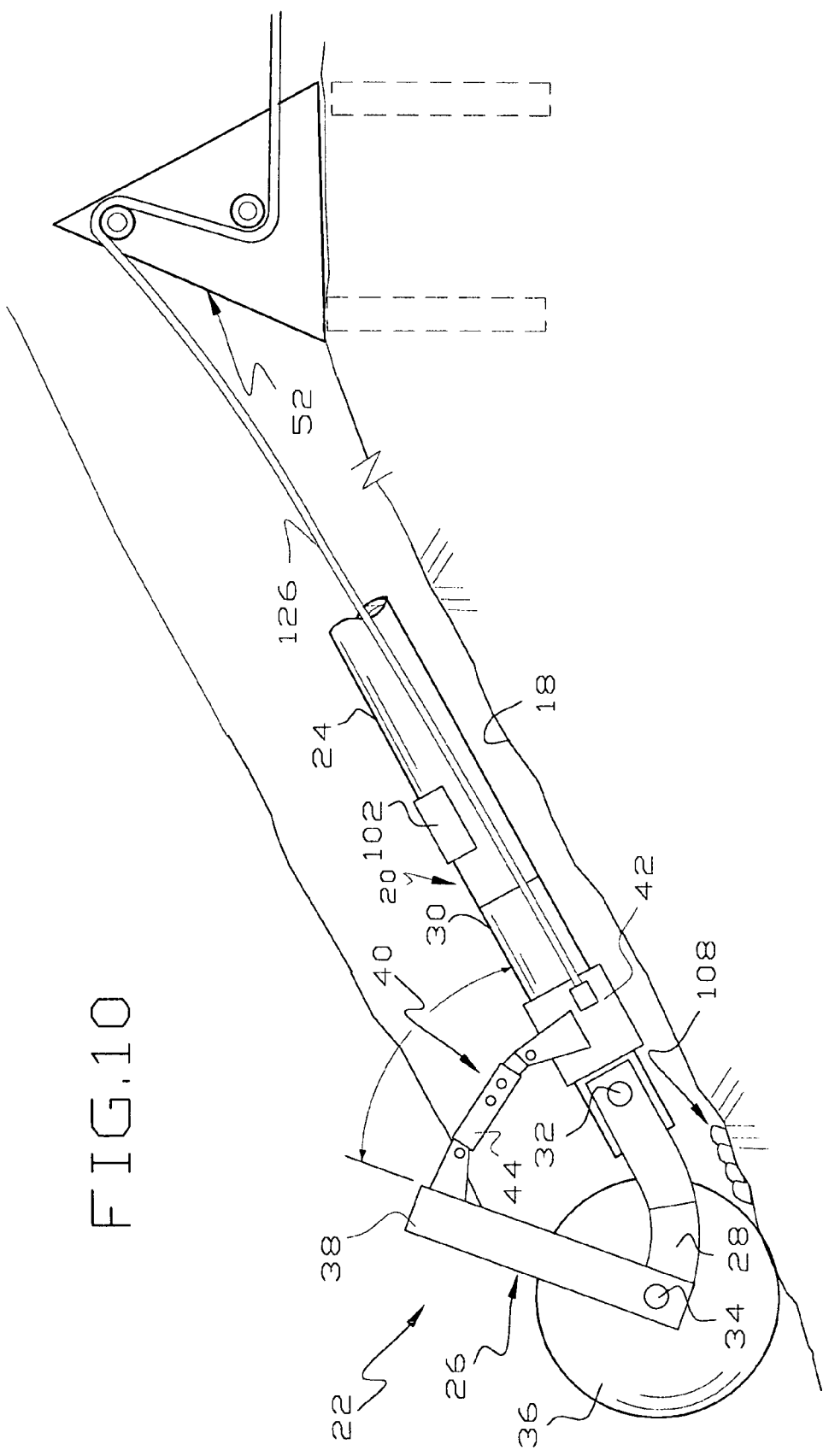
FIG. 10 is a view, similar to FIG. 3, of an alternative technique for lowering the pipeline down an incline.

Referring to FIG. 10, an alternative technique is illustrated to control the assembly 22 as it is lowered through the ditch 18. Rather than using a pair of slips 58, 60 and moving the upper slips 60 with the cable 62, a cable 126 extends from the winch system 64 down the pipeline 20 to adjacent the wheeled assembly 22 where it connects in any suitable fashion to the reinforcing pad 42. It will be seen that the assembly 22 is directly connected to the cable 62 and the assembly 22 is allowed to move down the ditch 18 when cable 126 is paid out from the winch system 64.

Although this invention has been disclosed and described in its preferred forms with a certain degree of particularity, it is understood that the present disclosure of the preferred forms is only by way of example and that numerous changes in the details of construction and operation and in the combination and arrangement of parts may be resorted to without departing from the spirit and scope of the invention as hereinafter claimed.

I claim:

1. A method of laying pipeline, having a lower end providing a load bearing assembly, along inclined terrain having an inclined upwardly open ditch, having a bottom, extending between upper and lower vertically spaced locations, comprising placing the load bearing assembly directly on the bottom of the ditch at a site adjacent the upper location and then moving the pipeline down the ditch toward the lower location.

2. The method of claim 1 wherein the moving step comprises sliding the pipeline down the ditch.

3. The method of claim 2 further comprising placing a series of stationary, non-rotatable bearings in the ditch supporting a section of the pipeline above a bottom of the ditch, the bearings being spaced apart along a length direction of the ditch, and sliding the pipeline on the bearings.

4. The method of claim 3 wherein the pipeline includes a coating and the bearings are softer than the pipeline coating so that wear during sliding movement occurs on the bearings and not on the pipeline coating.

5. The method of claim 3 further comprising lubricating the bearings with a liquid lubricant.

6. The method of claim 3 further comprising the step of removing the bearings after a lower end of the pipeline reaches the lower location.

7. The method of claim 1 wherein the load bearing assembly comprises a wheeled device adjacent a lower end of the pipeline, and further comprising applying the wheeled device directly to the bottom of the ditch and rolling the wheeled device and lower end of the pipeline down the ditch.

8. The method of claim 7 further comprising the step of adjusting a vertical angle between the wheeled device and the lower end of the pipeline.

9. The method of claim 1 wherein the moving step comprises adding additional joints of pipe to an upper end of the pipeline.

10. The method of claim 1 wherein the placing step comprises positioning the pipeline at an incline in the ditch leaving an upper end of the pipeline at an incline and the moving step comprises placing the additional joint at an angle concentric with the upper end of the pipeline, welding the additional joint to the pipeline while in an inclined position and then lowering the additional joint into the ditch.

11. The method of claim 1 further comprising the step of stabilizing the pipeline in the ditch after a lower end of the pipeline reaches the lower location by at least partially backfilling the ditch.

12. A method of laying pipeline along inclined terrain having an inclined upwardly open ditch extending between upper and lower vertically spaced locations, comprising placing the pipeline in the ditch at a site adjacent the upper location and moving the pipeline down the ditch toward the lower location including steering a lower end of the pipeline away from a side of the ditch.

13. The method of claim 12 wherein the steering step comprises placing a jack between the lower end of the pipeline and the ditch and extending the jack thereby forcing the lower end of the pipeline away from a side of the ditch.

14. A method of laying pipeline along inclined terrain providing upper and lower vertically spaced locations, comprising
   a) digging an upwardly open ditch, having a bottom, in the inclined terrain;
   b) providing an inclined pipeline section, adjacent the upper location, having an upper end and a lower end having a load bearing assembly thereon;
   c) welding an inclined pipe joint, coaxial with the pipeline section, onto the upper end adjacent the upper location; and then
   d) lowering the inclined pipeline section and the inclined pipe joint from adjacent the upper location toward the lower location while supporting the load bearing assembly directly on the bottom of the ditch.

15. The method of claim 14 further comprising repeating steps c) and d) to produce a pipeline extending from adjacent a top of the inclined terrain to adjacent a bottom of the inclined terrain.

16. Apparatus for lowering a pipeline in an upwardly open ditch down a pathway on an incline having a top and a bottom, comprising
   a frame having a member bearing directly on the ditch and including a device for receiving and attaching to the pipeline adjacent a lower end thereof; and
   a system for lowering the frame along the pathway and thereby allowing the pipeline to move through the ditch down the incline.

17. The apparatus of claim 16 further comprising a system for adjusting a vertical angle between the member and the device for receiving and attaching to the pipeline.

18. The apparatus of claim 16 wherein the member is a wheel.

19. The apparatus of claim 16 wherein the lowering system includes a cable attached to the frame and a winch for paying out the cable.

20. The apparatus of claim 16 wherein the lowering system includes a relatively stationary set of slips and a relatively movable set of slips for gripping the pipeline at locations spaced along a length dimension of the pipeline, a force applying mechanism attached to the movable set of slips for resisting movement of the pipeline and a control system for controlling the slips and the force applying mechanism.

21. The apparatus of claim 20 wherein the control system selectively energizes the slips
   for gripping the pipeline with the stationary set of slips,
   for releasing the stationary set of slips and gripping the pipeline with the movable set of slips thereby allowing the movable set of slips to move downwardly along the incline as allowed by the force applying mechanism and thereby lowering the pipeline, and
   for gripping the pipeline with the stationary set of slips and releasing the movable set of slips from the pipeline thereby allowing the movable set of slips to move upwardly along the incline by a force applied by the force applying mechanism to a position adjacent the stationary set of slips.

22. The apparatus of claim 16 wherein the pathway provides an axis of movement of the pipeline and further comprising a system for moving the member laterally of the axis and thereby steering the pipeline along the pathway.

23. Apparatus for lowering a pipeline down a pathway on an incline having a top and a bottom, comprising
   a frame having a member bearing on the incline and including a device for receiving and attaching to the pipeline adjacent a lower end thereof; and
   a system for adjusting a vertical angle between the member and the device for receiving and attaching to the pipeline.

24. Apparatus for lowering a pipeline along an axis of movement down a pathway on an incline having a top and a bottom, comprising
   a frame having a member bearing directly on the incline and including a device for receiving and attaching to the pipeline adjacent a lower end thereof;
   a system for lowering the pipeline from adjacent the top to adjacent the bottom; and
   a system for steering the pipeline along the pathway including at least one device for moving the member laterally of the axis.

* * * * *